(12) United States Patent
Fletcher

(10) Patent No.: US 8,177,011 B2
(45) Date of Patent: May 15, 2012

(54) EASILY REMOVABLE FORECAB FOR A MOTORCYCLE

(76) Inventor: Len Edward Fletcher, Franklinton, NC (US)

(*) Notice: Subject to any disclaimer, the term of this patent is extended or adjusted under 35 U.S.C. 154(b) by 250 days.

(21) Appl. No.: 12/657,950

(22) Filed: Jan. 30, 2010

(65) Prior Publication Data

US 2010/0193274 A1 Aug. 5, 2010

Related U.S. Application Data

(60) Provisional application No. 61/206,710, filed on Feb. 3, 2009.

(51) Int. Cl.
*B62D 61/06* (2006.01)
*B62K 13/04* (2006.01)

(52) U.S. Cl. ........... 180/209; 180/11; 180/210; 280/202

(58) Field of Classification Search ............... 180/11, 180/15, 16, 209, 210, 216; 280/202, 203, 280/402; 410/3, 11
See application file for complete search history.

(56) References Cited

U.S. PATENT DOCUMENTS

| | | | | |
|---|---|---|---|---|
| 1,092,910 A | * | 4/1914 | Harley | 280/202 |
| 148,803 A | | 3/1925 | Fehrer | |
| 3,419,098 A | * | 12/1968 | Mayers et al. | 180/11 |
| 361,035 A | | 10/1971 | Lorff | |
| 3,740,074 A | * | 6/1973 | Coil | 280/402 |
| 3,822,898 A | * | 7/1974 | Brownlie | 280/402 |
| 3,872,938 A | * | 3/1975 | DeGroot | 180/185 |
| 4,088,199 A | * | 5/1978 | Trautwein | 180/209 |
| 4,441,736 A | * | 4/1984 | Shedden | 280/754 |
| 450,675 A | | 3/1985 | Wood, Jr. | |
| 4,770,431 A | * | 9/1988 | Kulik | 280/202 |
| 5,011,169 A | * | 4/1991 | Henderson et al. | 280/202 |
| 5,193,831 A | * | 3/1993 | Capitoli | 280/202 |
| 523,606 A | | 8/1993 | Huber | |
| 6,065,914 A | * | 5/2000 | Fotou | 410/3 |
| 6,341,658 B1 | * | 1/2002 | Rosenwald | 180/180 |
| 2006/0198711 A1 | * | 9/2006 | Mock | 410/3 |

FOREIGN PATENT DOCUMENTS

| | | | |
|---|---|---|---|
| GB | 2074523 | * | 11/1981 |
| GB | 2309209 | * | 12/1984 |
| GB | 2256403 | * | 12/1992 |

* cited by examiner

*Primary Examiner* — Paul N Dickson
*Assistant Examiner* — George Spisich
(74) *Attorney, Agent, or Firm* — Jerome E Sacks

(57) ABSTRACT

A forecab and additional electrical and mechanical components attachable to a motorcycle for converting a motorcycle between its standard configuration and a three-wheeled vehicle is disclosed. The forecab has two front wheels, chassis, a body, a motorcycle front wheel cradle, headlights and parking lights, and standard automobile-type components such as a steering wheel, foot brake, clutch, and foot-manipulated gas pedal. The forecab components are connected to corresponding motorcycle components using both electrical connections, and mechanical linkages as appropriate. The invention adds components to the motorcycle so that the linkages between the forecab and the motorcycle component may be implemented. The mechanical linkages, electrical connections and motorcycle-securing mechanisms are designed to they can be easily connected and disconnected in a manner so that the biker can easily transition between the three-wheeled motorcycle-powered vehicle and the standard motorcycle without tools.

11 Claims, 8 Drawing Sheets

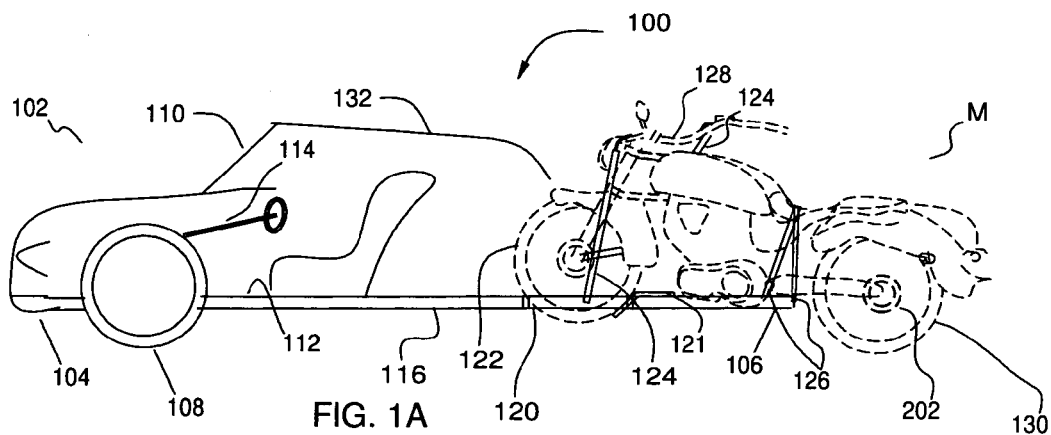
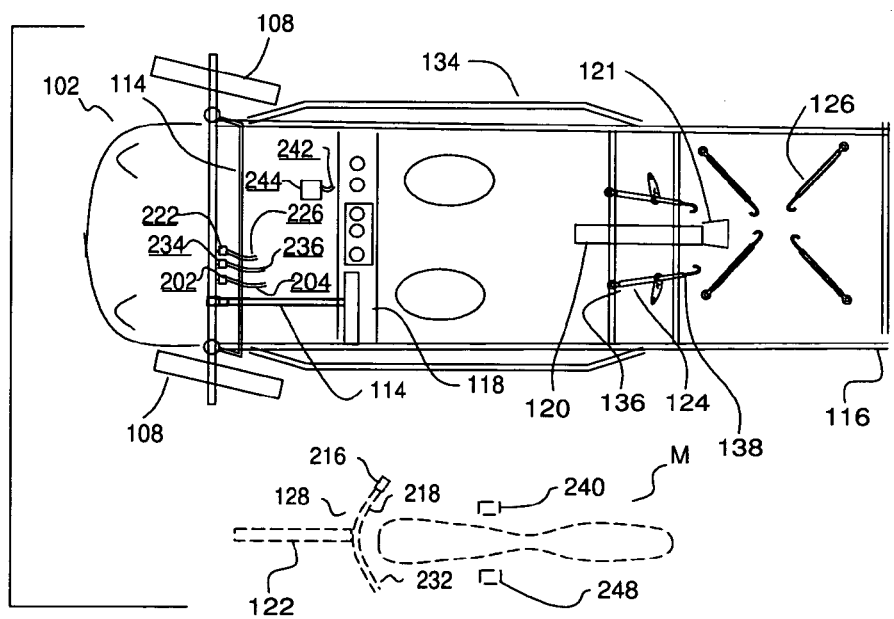
FIG. 1A
FIG. 1B

EASILY REMOVABLE FORECAB FOR A MOTORCYCLE

CROSS-REFERENCE TO RELATED APPLICATIONS

This application claims the benefit of the U.S. Provisional Patent Application No. 61/206,710 filed Feb. 3, 2009 by the present inventor. This provisional patent application is incorporated herein in its entirety by reference.

TECHNICAL FIELD

The invention presented herein relates to motorcycle accessories. More particularly it relates to accessories that convert a motorcycle into a three-wheeled vehicle.

BACKGROUND OF THE DISCLOSURE

Motorcycles are a popular means of transportation providing an alternative to the automobile. They provide the biker with an exhilarating driving experience while at the same time reducing transportation costs and limiting the use of gasoline in a green environment. However, with the advantages of owning and riding a motorcycle come certain limitations, viz. exposure to the weather, lack of space for luggage, inconvenience of passengers, and a fatigue-inducing driving position for long distance trips.

To overcome some of the limitations of riding a motorcycle mentioned above, various methods have been suggested. One of the more popular methods provides a cab that is attached to the motorcycle, and provides a hybrid-type of solution: a motorcycle with a cab. There are various ways of doing this: the sidecar provides a degree of passenger comfort, but adds a bit of instability to the motorcycle and does not alleviate the fatigue or weather factor for the biker. Forecabs that are permanently attached to the front of the motorcycle have also been proposed, but they typically require removal of the front wheel; therefore they largely take away from the biker the opportunity to conveniently use the motorcycle for normal use. Therefore there is a need for an alternate approach that provides a forecab when appropriate, but allows the biker to remove the forecab and easily revert to the standalone motorcycle when desired.

SUMMARY OF THE DISCLOSURE

The invention presented herein solves the problem of providing a forecab for a motorcycle that is easily attached to the motorcycle, and provides an automobile-like driving experience while using the motorcycle's major functions such as braking, power, and transmission. The invention permits the forecab to be easily detached from the motorcycle so the motorcycle is available for use in its standard configuration. The forecab has a chassis with a cradle wherein the motorcycle's front wheel is inserted. The motorcycle is then secured to the chassis using securing devices such as compression rods, flex rods or ratchet straps such that only the motorcycle's back wheel touches the road, together with the forecab's front wheels.

The forecab has two front wheels, chassis, a body, a motorcycle front wheel cradle, headlights, driver and passenger seats, and standard automobile-type components such as a steering wheel, foot brake, clutch, and foot-manipulated accelerator pedal. The forecab components are connected to the corresponding motorcycle components using both electrical connections and mechanical linkages as appropriate. In the present invention, components are added to the motorcycle so that the connections and linkages may be implemented easily. The linkages and motorcycle securing devices may be designed so they can be easily connected and disconnected in a manner so that the biker can easily transition between the three-wheeled motorcycle-powered vehicle and the standard motorcycle without the use of tools.

BRIEF DESCRIPTION OF THE DRAWINGS

FIG. 1A is a side view of a first embodiment of the present invention when the first embodiment is in a three-wheeled vehicle configuration.

FIG. 1B is a top view of the first embodiment of the present invention when the motorcycle is not attached to the forecab.

Figure 2A:
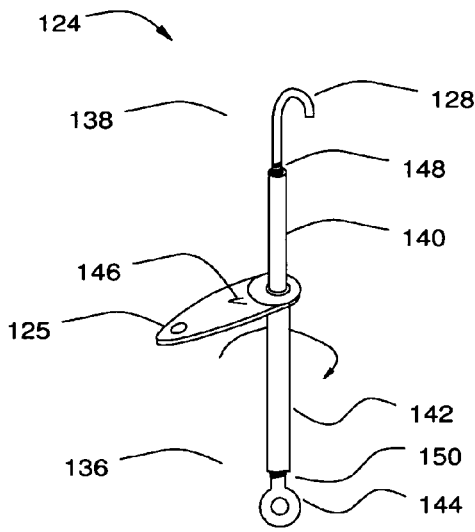
FIG. 2A is a perspective view of a compression rod of the first embodiment of the present invention.

FIGS, 12A and 12B are a front view of an alternate embodiment of the present invention wherein the chassis and motorcycle is modified to allow towing of the forecab by the motorcycle.

DETAILED DESCRIPTION

As used in this specification and claims the term standard motorcycle refers to a typical two-wheeled motorcycle.

FIG. 1A illustrates a side view of the forecab 102 and the mechanical control components and the electrical wiring components attachable to a standard motorcycle M of a first embodiment 100 of the present invention. The standard motorcycle is not part of the invention. In FIG. 1A, motorcycle M and forecab 102 are mated so they function as a three-wheeled vehicle.

FIG. 1B illustrates a top view of first embodiment 100 and motorcycle M. FIG. 1B illustrates the forecab 102 and motorcycle M separated such that motorcycle M operates as a standalone motorcycle.

Referring to FIGS. 1A and 1B, first embodiment 100 is comprised of forecab 102 that has two front wheels 108, a windshield 110, a floor 112, steering components 114 and a chassis 116 having a chassis front end 104 and chassis rear end 106. An optional roof 132 is attached to a forecab body 134. Chassis 116 has a cradle 120 with a pivotal ramp 121 designed to hold a motorcycle front wheel 122 of motorcycle M. Motorcycle M may be physically secured to forecab 102 by putting motorcycle front wheel 122 of motorcycle M into cradle 120 so that the cradle cradles the putting motorcycle front wheel 122, and then using securing devices such as compression rods 124 and flex rods 126.

After motorcycle front wheel 122 of motorcycle M is inserted into cradle 120, securing motorcycle M to forecab 102 is performed as follows. Referring to FIGS. 1A, 1B, 2A, and 2B, a pair of compression rods 124 with a compression rod first end 136 is attached to chassis 116 and a compression rod second end 138 having an attaching mechanism such as a hook 128 that attaches to the motorcycle handle bars. When compression rods 124 are attached to motorcycle M and are tightened, the front springs of motorcycle M are compressed and motorcycle M is held tightly against chassis 116. (Front springs are not shown in the figures). Two sets of flex rods 126 are then used to secure and stabilize the forecab 102 to the frame of motorcycle M. Forecab 102 is dimensioned and configured such that when motorcycle M is secured to chassis 116, the two forecab front wheels 108 and motorcycle rear wheel 130 becomes a three-wheeled vehicle.

FIG. 2A illustrates a compression rod 124. Compression rod 124 has a top tube 140 fitting inside and ratchetly connected to a bottom tube 142, a hook 128 positioned at compression rod second end 138 and rotationally attached to top tube 140 with top threads 148, a ratchet handle 125 with a control knob 146, and a threaded rod with an eyelet 144 rotationally attached to bottom tube 142 with bottom threads 150. When threaded rod with an eyelet 144 is bolted to forecab chassis 116 and hook 128 attached to the motorcycle frame, compression rod 124 compresses compression rod first end 136 toward compression rod second end 138 when ratchet handle 125 is rotated in a first rotational direction and control knob 146 is set for compression, and moves compression rod first end 136 away from compression rod second end 138 when ratchet handle 125 is rotated in a second rotational direction and control knob 146 is set for expansion.

Figure 2B:
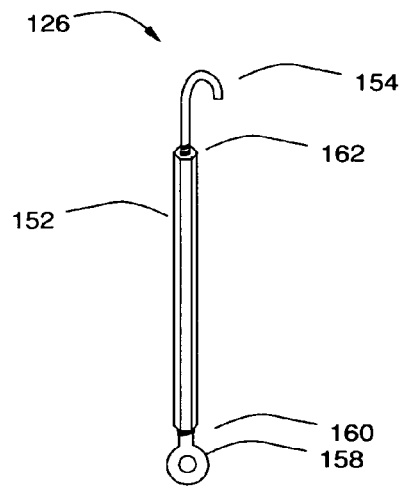
FIG. 2B is a perspective view of a flex rod of the first embodiment of the present invention.

FIG. 2B illustrates a flex rod 126. Flex rod 126 has a single internally threaded hexagonal tube 152, a threaded rod with an eyelet 158 threadingly attached to hexagonal tube 152 at hexagonal tube first end 160, and a threaded rod with an attaching mechanism such as a hook 154 threadingly attached a hexagonal tube second end 162. Flex rod 126 functions as a turnbuckle. When threaded rod with an eyelet 158 is bolted to forecab chassis 116, then threaded rod with a hook 154 may be hooked on motorcycle frame and compressed or expanded by turning hexagonal tube 152 in a first rotational direction or a second rotational direction.

Figure 3:
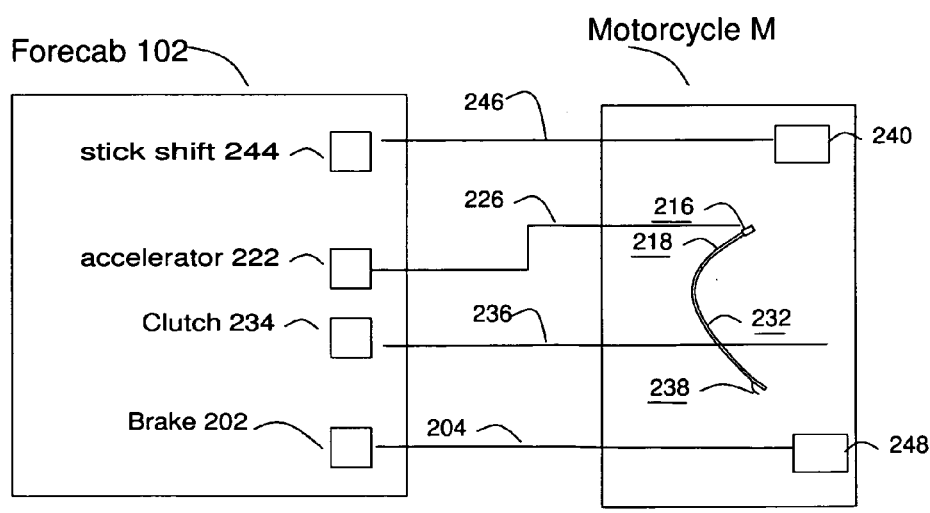
FIG. 3 is a schematic diagram of the mechanical control components of the first embodiment of the present invention with the forecab attached to the motorcycle.
Figure 4:
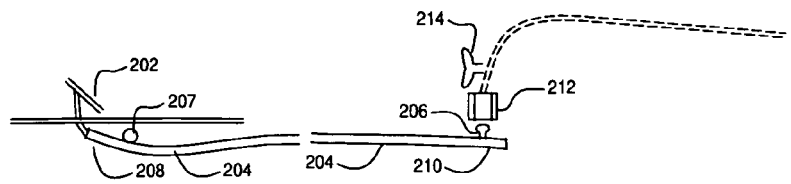
FIG. 4 is a front view of the brake hydraulic control components of the first embodiment of the present invention.

FIG. 3 is a schematic diagram illustrating the mechanical and hydraulic connections between motorcycle M and forecab 102 when in the three-wheeled configuration. FIG. 4 illustrates the linkage between an automobile-type forecab brake pedal 202 and the motorcycle braking system. Referring now to FIGS. 1B, 3 and 4, forecab brake pedal 202 is installed on floor 112 of forecab 102. Forecab brake pedal 202 has a hydraulic line 204 cooperatively communicating with forecab brake pedal 202 at a hydraulic line first end 208 with a nipple 206 installed at a hydraulic line second end 210. A hydraulic fluid reservoir 207 is connected to hydraulic line 204. First embodiment 100 has added to the hydraulic line 204 of motorcycle M a quick-connect hydraulic coupler 212 that is mated to nipple 206, and additionally has added to the hydraulic line 204 a bleeder valve 214 that is used to purge air from hydraulic line 204 during installation. Hydraulic fluid reservoir 207 replenishes hydraulic fluid as needed when bleeder valve 214 is used.

Figure 5A:
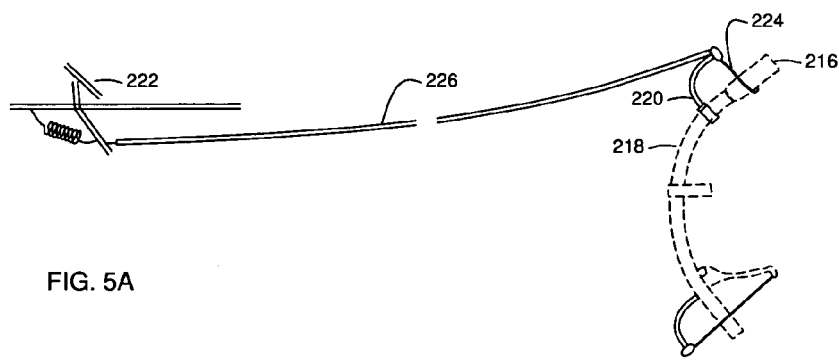
FIG. 5A is a front view of the accelerator mechanical control components of the first embodiment of the present invention.

Referring now to FIGS. 1B, 3 and 5A, motorcycle M has, as standard equipment, a rotatable motorcycle right hand grip 216 located on a motorcycle right-hand handlebar 218. Fuel is fed to the engine of motorcycle M as motorcycle right hand grip 216 is rotated. Forecab 102 has an automobile-type accelerator foot pedal 222 installed on floor 112 of forecab 102. Accelerator foot pedal 222 has an accelerator mechanical cable 226 cooperatively communicating with the motorcycle right hand grip 216 using an added accelerator support bracket 220 slidingly hosting a cable wire 224 that is rotationally attached to motorcycle right hand grip 216. As the forecab biker presses accelerator foot pedal 222, the cable wire 224 of the accelerator mechanical cable 226 is pulled so that motorcycle right hand grip 216 rotates, thereby controlling the vehicle's acceleration.

Figure 5B:
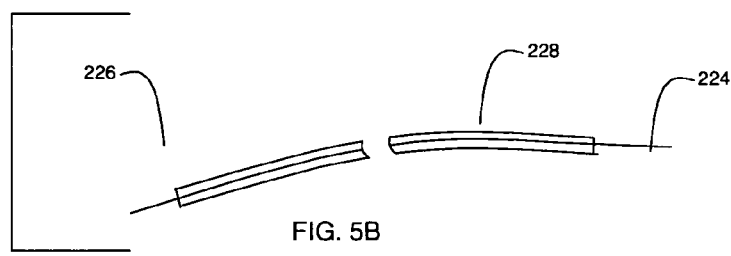
FIG. 5B is a front view of a mechanical cable of the first embodiment of the present invention.

Referring to FIGS. 5A and 5B, the term mechanical cable used in this specification and the appended claims refers to an inner flexible wire 224 surrounded by a flexible cable sheaf 228. Flexible sheaf 228 is attached to the first embodiment components (forecab chassis and the motorcycle attachments) of the present invention. Inner flexible wire 224 is free to move within cable sheaf 228.

Figure 6A:
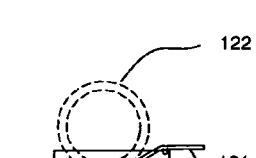
FIGS. 6A, 6B, and 6C are two side views and a top view respectively of a cradle of the first embodiment of the present invention.
Figure 6B:
Figure 6C:
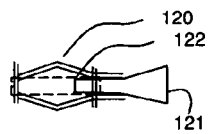

FIG. 6A is a side view of cradle 120 holding motorcycle front wheel 122. A ramp 121 is pivotally attached to cradle 120. FIG. 6B is a side view of cradle 120 with ramp 121 positioned to allow front wheel 122 of motorcycle M to be rolled into cradle 120. As motorcycle front wheel 122 is rolled into cradle 120, ramp 121 rotates counterclockwise as front wheel 122 eases into cradle 120. FIG. 6C is a top view of cradle 120 with ramp 121 and motorcycle front wheel 122.

Referring to FIGS. 1A, 6A, 6B, and 6C, cradle 120 and ramp 121 are dimensioned and configured so that when the motorcycle front wheel 122 is secured to forecab 102, front wheel 122 is securely held in cradle 120 and ramp is positioned such that it does not interfere with the three-wheel vehicle configuration, as shown in FIG. 6A. To remove motorcycle M from cradle 120, compression rods 124 and flex rods 126 are removed from motorcycle M. Motorcycle front wheel 122 is then rolled along ramp 121.

Figure 7:
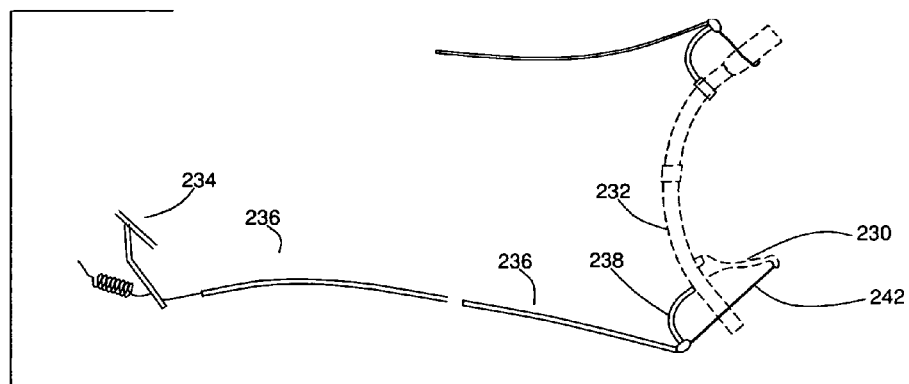
FIG. 7 is a perspective view of a clutch of the first embodiment of the present invention.

Referring now to FIGS. 1B, 3, and 7, motorcycle M has as standard equipment, a clutch lever 230 located on a motorcycle left-hand handlebar 232. When clutch lever 230 is squeezed, the motorcycle's clutch is disengaged. Forecab 102 has an automobile-type forecab clutch pedal 234 installed on floor 112 of forecab 102. Forecab clutch pedal 234 has a mechanical clutch cable 236 cooperatively communicating with clutch lever 230 located on left-hand handlebar 232. Connection is facilitated using a clutch support bracket 238, part of the first embodiment of the present invention that has been added to Motorcycle M. Clutch support bracket 238 guides a clutch cable wire 242. As the forecab biker presses clutch pedal 234, clutch cable wire 242 causes lever 230 to respond as if it is squeezed directly by the biker.

Figure 8:
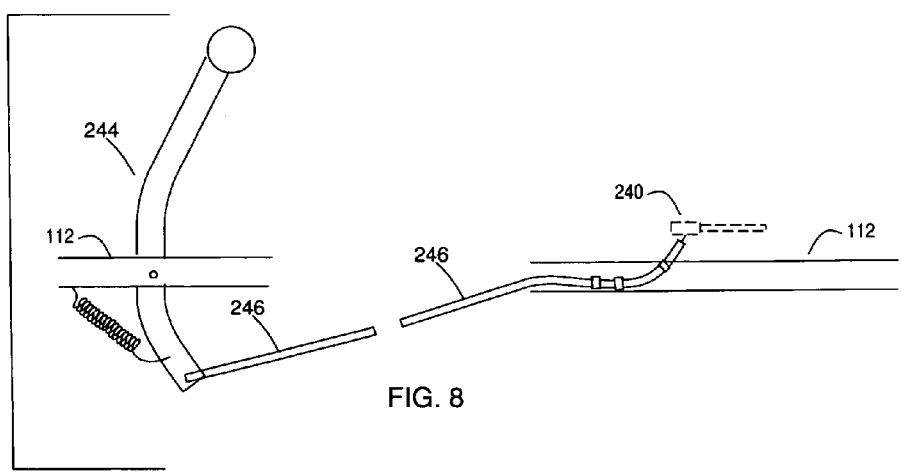
FIG. 8 is a front view of a shifter of the first embodiment of the present invention.

Referring now to FIGS. 1B, 3, and 8, motorcycle M has, as standard equipment, a motorcycle foot shift pedal 240 located on the left-hand side of motorcycle M. Forecab 102 has an automobile-type stick shift 244 installed on floor 112 of forecab 102. Forecab stick shift 244 has a forecab shift cable 246 cooperatively communicating with motorcycle foot shift pedal 240. As the forecab biker manipulates the forecab stick shift 244, motorcycle foot shift pedal 240 acts as if is pressed by the forecab biker.

Figure 9A:
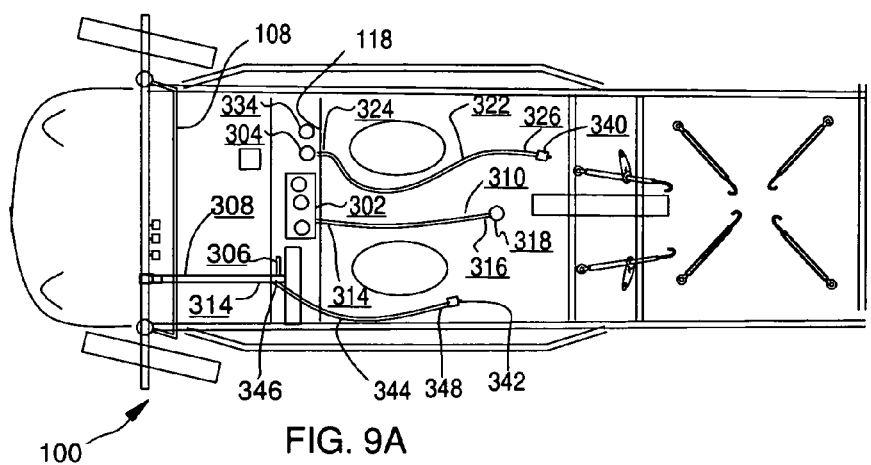
FIG. 9A is a top view of the electrical components of the forecab of the first embodiment of the present invention.
Figure 9B:
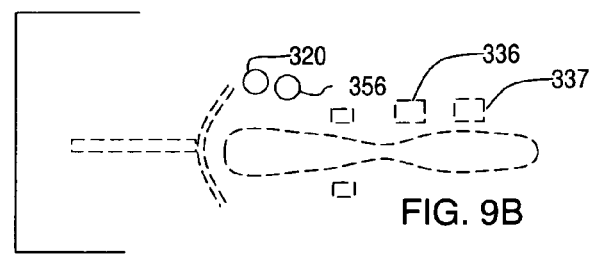
FIG. 9B is a top view of the electrical components of the motorcycle used by the first embodiment of the present invention.

FIGS. 9A and 9B illustrate a top view of the electrical systems on forecab 102 and motorcycle M used to convert motorcycle M to a three-wheeled vehicle. Referring to FIG. 9A, the electrical system is grouped into a set of forecab performance gauges 302, a forecab two-level lights switch 304 and a forecab turn signal lever 306 and an ignition switch 334. The set of forecab performance gauges 302 include a fuel gauge, an oil pressure gauge, and a temperature gauge. Additional gauges such as a speedometer, tachometer and charging system gauge may also be included.

Referring to FIG. 9A, the set of forecab gauges 302 has a forecab instrument electrical wiring cable 310 such that electrical wiring cable first end 314 is cooperatively communicating with the set of forecab performance gauges 302 and the forecab electrical wiring cable second end 316 has a forecab male pigtail 318 cooperatively communicating with the electrical wiring cable second end 316.

Referring again to FIG. 9A, forecab two-level lights switch 304 that controls headlights and parking lights on forecab 102 is located on a forecab dashboard 118. Forecab turn signal lever 306 controls forecab and motorcycle turn signals lights and is located on a forecab steering wheel shaft 308. Ignition switch 334 is located on dashboard 118. Forecab two-level lights switch 304 has a switch electrical wiring cable 322 such that the forecab switch electrical wiring cable first end 324 is cooperatively communicating with forecab two-level lights switch 304 and the forecab switch electrical wiring cable second end 326 has a forecab switch plug 340 cooperatively communicating with electrical wiring cable second end 326. Turn signal lever 306 has a turn signal electrical wiring cable 344 cooperatively communicating such that turn signal electrical wiring cable first end 346 is cooperatively communicating with turn signal lever 306 and a turn signal electrical wiring cable second end 348 has a turn signal plug 342 cooperatively communicating with the turn signal electrical wiring cable 344.

Figure 10:
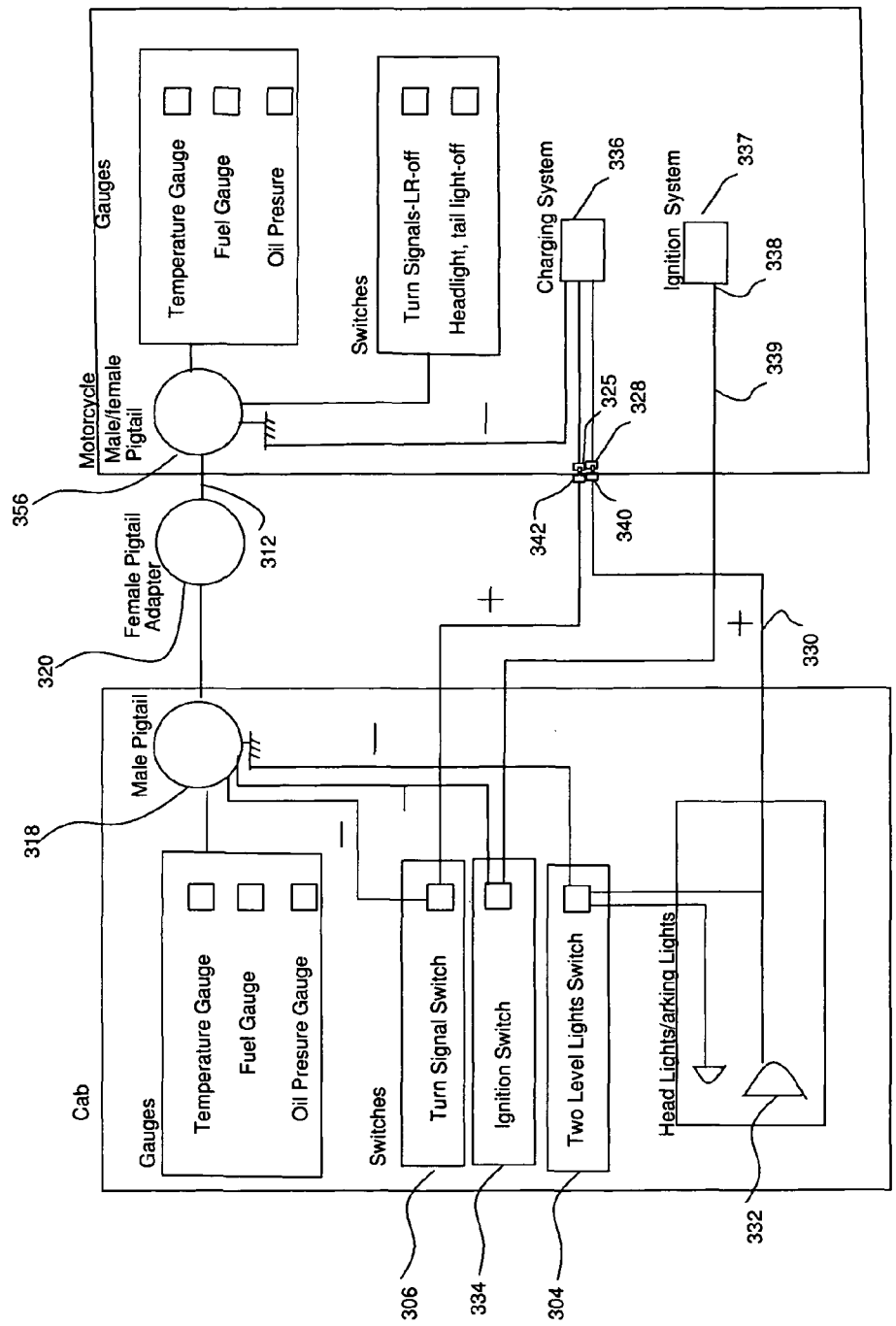
FIG. 10 is a schematic view of the electrical components of the forecab and the motorcycle components of the first embodiment of the present invention.

FIG. 10 is a schematic view illustrating the electrical wiring connections between motorcycle M and forecab 102. Referring to FIGS. 9A, 9B and 10, motorcycle M, as standard equipment, has a motorcycle female pigtail as part of a male/female pigtail connector pair 356 that connects the motorcycle performance gauges to the motorcycle electrical system. An adapter female pigtail 320 of the first embodiment is added to a motorcycle instrument electrical wiring cable 312 on motorcycle M that has the same connection properties as motorcycle female pigtail on the motorcycle male/female pigtail 356. Referring to FIGS. 9A, 9B and 10, forecab male pigtail 318 is configured so that it mates with the adapter female pigtail 320 installed on motorcycle M. To activate the forecab performance gauges 302 in forecab 102, forecab male pigtail 318 is plugged into the adapter female pigtail 320 of motorcycle M.

Referring again to FIGS. 9A, 9B and 10, forecab two-level lights switch 304 of forecab 102 is connected to the electrical system of motorcycle M using forecab switch plug 340 attached on the end of switch electrical wiring cable 322. A lights switch socket 328 is installed on the motorcycle electrical wiring that accepts forecab switch plug 340. The headlights and parking lights 332 are connected to the motorcycle electrical system through a headlight electrical wiring cable 330. The charging system 336 of motorcycle M provides a consistent electrical charge to the motorcycle electrical components. The actual components depend on the specific motorcycle used; the major components generally include a battery and an alternator or generator.

Referring again FIGS. 9A, 9B and 10, turn signal lever 306 of forecab 102 is connected to the electrical system of the motorcycle directly. The actual connection is accommodated by having a forecab turn signal plug 342 mated to a turn signal socket 325 that is installed on the motorcycle electrical wiring that accepts the forecab turn signal plug 342.

Referring again FIGS. 9A, 9B and 10, ignition switch 334 of forecab 102 is connected to the motorcycle ignition system 337. The actual connection is accommodated by having a conductive removable clamp 338 clipped to the ignition system positive wire using an ignition system wiring cable 339 initiating from forecab ignition switch 334.

To convert forecab 102 into a three-wheeled vehicle configuration, motorcycle M is secured to forecab 102 by inserting the motorcycle front wheel 122 into cradle 120, securing motorcycle M to the forecab chassis 116 using the compression rods 124 and stabilizer rods 126, and then connecting the forecab mechanical linkages and electrical connections to the corresponding first embodiment mechanical and electrical components that have been added to the motorcycle. When first embodiment 100 is in the three-wheeled vehicle configuration, a biker sits in the biker's seat in forecab 102, and drives the three-wheeled vehicle similar to driving a car.

To convert first embodiment 100 back into a normal motorcycle configuration, compression rods 124 and stabilizer rods 126 are released, the forecab mechanical linkages and electrical connections are disengaged from the corresponding apparatus that have been added to motorcycle M. The motorcycle is then lifted from cradle 120 and removed from forecab 102. Motorcycle M then functions as a standalone motorcycle.

Figure 11:
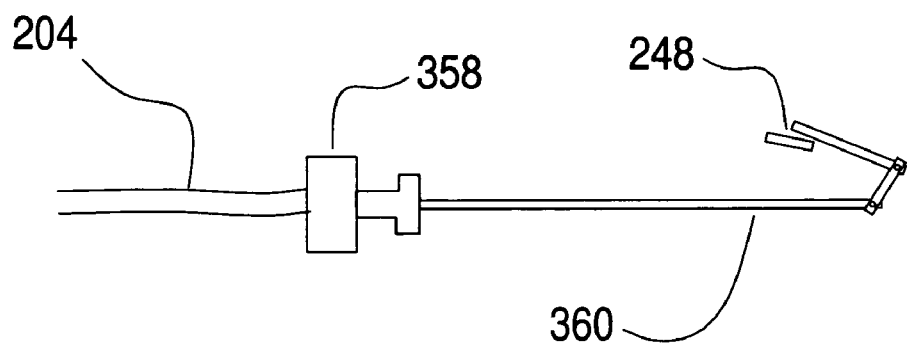
FIG. 11 is a side view of a non-hydraulic motorcycle brake system of an alternate embodiment of the present invention.

Alternate embodiments to the first embodiment are consistent with the inventive concept presented herein. FIG. 11 illustrates an alternate embodiment when the motorcycle has a mechanical rather than a hydraulic brake. In this alternate embodiment, forecab hydraulic line 204 from the forecab is connected to a piston 358 that drives a mechanical linkage 360 that is operationally connected to motorcycle brake pedal 248.

In another alternate embodiment to the first embodiment, the hydraulic brake line from the forecab may be replaced by a mechanical cable brake line.

In another alternate embodiment to the first embodiment, the compression rods and flex rods used for securing the motorcycle to the forecab may be replaced by other devices such as ratchet straps.

Figure 12A:
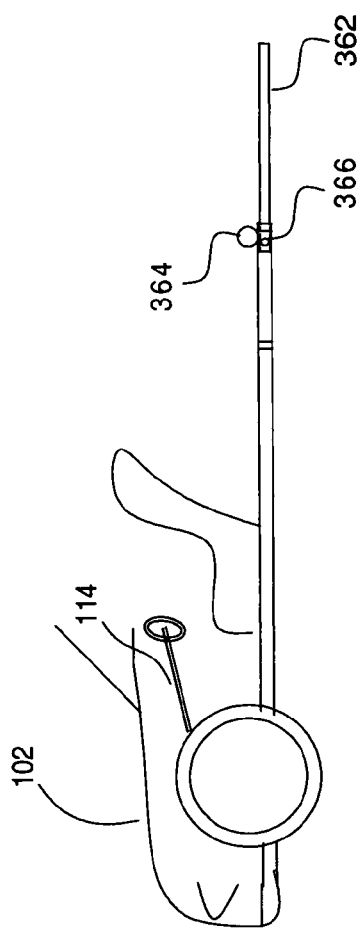
Figure 12B:
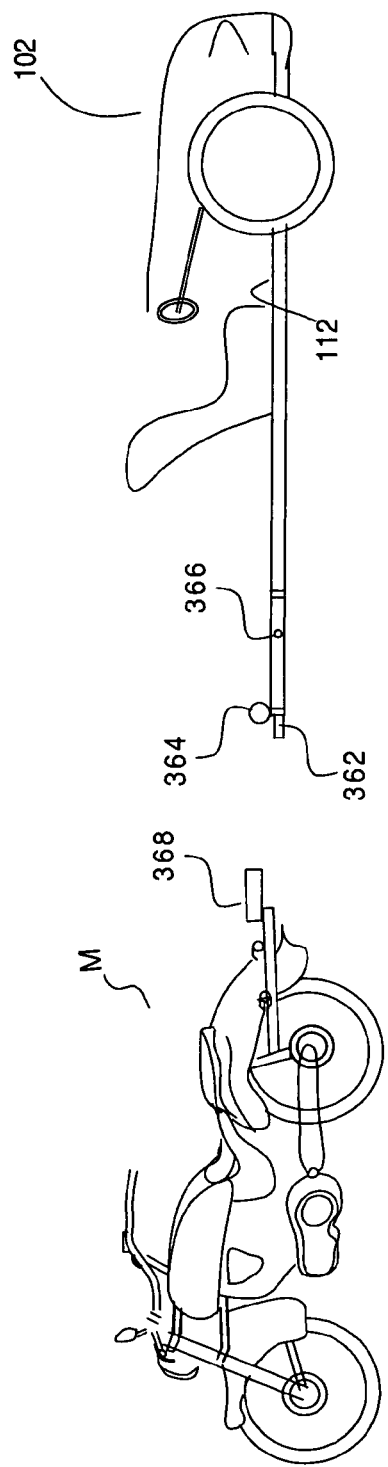

Referring now to FIG. 12A, in still another alternate embodiment to the first embodiment, chassis 112 may have a forecab slidable extension 362 at the forecab's chassis 112 located at the rear end 106 of chassis 112. Chassis 112 also includes a trailer hitching post 364. In this alternate embodiment, slidable extension 362 may be extended and secured with a removable bolt and wing nut 366 that goes through the slidable extension 362 and a hole in the chassis when used in the three-wheeled configuration. Motorcycle M has a hitching post connector 368 attached to the frame of motorcycle M. When motorcycle M is removed and used in its normal configuration, slidable extension 362 is retracted and secured with removable bolt and wing nut 366, and the motorcycle can then tow forecab 102. To tow the forecab with motorcycle M, hitching post connector 368 is attached to hitching post 364.

In still another alternate embodiment, the automobile-type mechanical connector components such as the accelerator pedal, the clutch pedal and the steering components may be replaced by a handle bar with motorcycle controls.

All the connections between the forecab mechanical linkages and the electrical connections and the motorcycle with the added connectors may be implemented so that no tools are required to convert between a three-wheeled vehicle and a standard motorcycle. The electrical connectors are attached and removed using pigtails and plugs. The hydraulic connectors may be removed or attached using quick-connect couplers and bleeder valves wherein the hydraulic fluid reservoir 207 replaces lost fluid. The mechanical linkages may be similarly configured to allow them to be connected or released without tools. For example, accelerator foot pedal 222 is connected to right handlebar 218 using accelerator support bracket 220 supporting wire 224. If accelerator support bracket 220 is secured to right handlebar 218 using a wing nut, then accelerator support bracket 220 may be loosened and wire 224 released from grip 216. Similarly mechanisms may be used for forecab clutch pedal 234 operationally connected to left handlebar 232 with clutch support bracket 238. If clutch support bracket 238 is loosened through a wing nut, it may be released. The connection between the mechanical linkage 360 and the motorcycle foot brake 248 may be made with a removable clamp attachable without tools.

The disclosure presented herein gives several alternate embodiments of the invention. These embodiments are to be considered as only illustrative of the invention and not a limitation of the scope of the invention. Various permutations, combinations, variations and extensions of these embodiments are considered to fall within the scope of this invention. Therefore the scope of this invention should be determined with reference to the claims and not just by the embodiments presented herein.

What is claimed is:

1. A forecab for removably attaching to a motorcycle, the motorcycle having a motorcycle front wheel, a motorcycle rear wheel, a motorcycle electrical system including a charging system, a set of motorcycle performance gauges and a set of motorcycle switches, and an engine, the forecab comprising:
    a forecab chassis, the forecab chassis having a forecab chassis front end and a forecab chassis rear end;
    a set of two forecab front wheels rotationally attached to the forecab chassis;
    a forecab steering mechanism installed on the forecab chassis and operationally coupled to the forecab front wheels configured for steering the forecab front wheels;
    a forecab cradle attached to the forecab chassis near the forecab chassis rear end, wherein the forecab cradle is adapted for removably cradling the motorcycle front wheel;
    at least one securing device for securing the motorcycle to the forecab such that when the motorcycle front wheel is engaged in the forecab cradle, and at least one securing device secures the motorcycle to the forecab, then the forecab with the motorcycle being secured to the forecab becomes a three-wheeled vehicle, the three wheels comprising the forecab front wheels and the motorcycle rear wheel; and
    mechanical control components positioned within the forecab for controlling the three-wheeled vehicle, and separate attachment components attached to the motorcycle operationally communicating with the mechanical control components including at least one of
        a clutch control positioned in the forecab cooperatively communicating through a clutch cable with a clutch control on the motorcycle for controlling the motorcycle clutch;
        a shift control positioned in the forecab cooperatively communicating through a shift cable with a shift control on the motorcycle for controlling the motorcycle shifting; and
        an accelerator control positioned in the forecab cooperatively communicating through an accelerator cable with the accelerator control on the motorcycle for controlling the motorcycle acceleration.

2. The forecab of claim 1 additionally comprising:
    a brake control positioned in the forecab cooperatively communicating through a hydraulic brake mechanism with a hydraulic braking control on the motorcycle for controlling the motorcycle braking.

3. The forecab of claim 1 additionally comprising:
    a brake control positioned in the forecab cooperatively communicating through a hydraulic brake mechanism with a mechanical braking control on the motorcycle for controlling the motorcycle braking.

4. The forecab of claim 1 additionally comprising:
    a brake control positioned in the forecab cooperatively communicating through a mechanical brake mechanism with a mechanical braking control on the motorcycle for controlling the motorcycle braking.

5. The forecab of claim 1 wherein the accelerator control is positioned on the floor of the forecab.

6. The forecab of claim 1 wherein the clutch control is positioned on the floor of the forecab.

7. The forecab of claim 1 wherein the shift control is positioned on the floor of the forecab.

8. The forecab of claim 1 additionally comprising:
    performance gauge monitoring components, positioned within the forecab for monitoring the three-wheeled vehicle performance, and attachment mechanism attached to the motorcycle including at least one of
        a fuel gauge for monitoring the fuel of the motorcycle, the fuel gauge operationally connected to the motorcycle fuel gauge electrical wiring;
        an oil pressure gauge for monitoring the motorcycle's oil pressure, the oil pressure gauge operationally connected to the motorcycle oil pressure electrical wiring;
        a temperature gauge for monitoring the motorcycle's engine temperature, the temperature gauge operationally connected to the motorcycle temperature electrical wiring; and
        a charging system gauge for monitoring the motorcycle charging system, the charging system gauge operationally connected to the motorcycle charging system electrical wiring.

9. The forecab of claim 8 wherein the performance gauge monitoring components are operationally connected to the motorcycle gauges through a pigtail attached to the motorcycle electrical wiring.

10. The forecab of claim 1 additionally comprising:
    switching components with electrical wiring operationally connected to a motorcycle charging system positioned on the motorcycle including at least one of
        a two-level lights switch for controlling the head lights and parking lights of the motorcycle and the forecab;
        a turn signal switch for controlling the turn signals on the forecab and the motorcycle; and
        an ignition switch for starting the engine of the motorcycle.

11. A forecab for removably attaching to a motorcycle, the motorcycle having a motorcycle front wheel, a motorcycle rear wheel, a motorcycle electrical system including a charging system, a set of motorcycle performance gauges and a set of motorcycle switches, and an engine, the forecab comprising:

a forecab chassis, the forecab chassis having a forecab chassis front end and a forecab chassis rear end;

a set of two forecab front wheels rotationally attached to the forecab chassis;

a forecab steering mechanism installed on the forecab chassis and operationally coupled to the forecab front wheels configured for steering the forecab front wheels;

a forecab cradle attached to the forecab chassis near the forecab chassis rear end, wherein the forecab cradle is adapted for removably cradling the motorcycle front wheel;

at least one securing device for securing the motorcycle to the forecab such that when the motorcycle front wheel is engaged in the forecab cradle, and at least one securing device secures the motorcycle to the forecab, then the forecab with the motorcycle being secured to the forecab becomes a three-wheeled vehicle, the three wheels comprising the forecab front wheels and the motorcycle rear wheel such that the securing devices may be attached to the motorcycle and released from the motorcycle without tools;

mechanical control components positioned within the forecab for controlling the three-wheeled vehicle, and separate attachment components attached to the motorcycle operationally communicating with the mechanical control components including at least one of a clutch control positioned in the forecab cooperatively communicating through a clutch cable with a clutch control on the motorcycle for controlling the motorcycle clutch;

a shift control positioned in the forecab cooperatively communicating through a shift cable with a shift control on the motorcycle for controlling the motorcycle shifting such that the mechanical control may be operationally connected to the motorcycle and also operationally disconnected from the motorcycle without tools;

an accelerator control positioned in the forecab cooperatively communicating through an accelerator cable with the accelerator control on the motorcycle for controlling the motorcycle acceleration such that the accelerator control may be cooperatively connected to the motorcycle and also cooperatively disconnected from the motorcycle without tools;

a brake control positioned in the forecab cooperatively communicating with the braking control on the motorcycle for controlling the motorcycle braking such that the brake control may be cooperatively connected to the motorcycle and also cooperatively disconnected to the motorcycle without tools;

performance gauge monitoring components, positioned within the forecab for monitoring the three-wheeled vehicle performance, and attachment mechanism attached to the motorcycle including at least one of a fuel gauge for monitoring the fuel of the motorcycle, the fuel gauge operationally connected to the motorcycle fuel gauge electrical wiring;

an oil pressure gauge for monitoring the motorcycle's oil pressure, the oil pressure gauge operationally connected to the motorcycle oil pressure electrical wiring;

a temperature gauge for monitoring the motorcycle's engine temperature, the temperature gauge operationally connected to the motorcycle temperature electrical wiring;

a charging system gauge for monitoring the motorcycle charging system, the charging system gauge operationally connected to the motorcycle charging system electrical wiring such that the performance monitoring components may be operationally connected to the motorcycle and also operationally disconnected to the motorcycle without tools; and switching components with electrical wiring operationally connected to a motorcycle charging system positioned on the motorcycle including at least one of a two-level lights switch for controlling the head lights and parking lights of the motorcycle and the forecab;

a turn signal switch for controlling the turn signals on the forecab and the motorcycle; and an ignition switch for starting the engine of the motorcycle such that the switching components may be operationally connected to the motorcycle and also operationally disconnected to the motorcycle without tools.

\* \* \* \* \*